(12) United States Patent  
Inzerillo et al.

(10) Patent No.: US 9,045,023 B2  
(45) Date of Patent: Jun. 2, 2015

(54) VEHICLE SLIDING ROOF DEVICE

(71) Applicant: Webasto SE, Stockdorf (DE)

(72) Inventors: Gioacchino Inzerillo, Settimo Torinese (IT); Pasquale Marrocco, Rivalta di Torino (IT)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/172,041

(22) Filed: Feb. 4, 2014

(65) Prior Publication Data

US 2014/0246883 A1 Sep. 4, 2014

(30) Foreign Application Priority Data

Mar. 4, 2013 (EP) .................................... 13001072

(51) Int. Cl.
*B60J 7/19* (2006.01)
*B60J 7/057* (2006.01)
*B60J 7/043* (2006.01)

(52) U.S. Cl.
CPC ........ *B60J 7/057* (2013.01); *B60J 7/192* (2013.01); *B60J 7/043* (2013.01)

(58) Field of Classification Search
CPC ........ B60J 7/1851; B60J 7/1855; B60J 7/192; B60J 7/194; B60J 7/057
USPC ...................................... 296/224; 292/DIG. 5
See application file for complete search history.

(56) References Cited

U.S. PATENT DOCUMENTS

| | | | | |
|---|---|---|---|---|
| 2,022,718 A | * | 12/1935 | Heins | 292/38 |
| 2,242,844 A | * | 5/1941 | Baier et al. | 292/8 |
| 3,002,785 A | * | 10/1961 | Larche | 296/120.1 |
| 3,372,954 A | | 3/1968 | De Coye De Castelet | |
| 4,134,611 A | * | 1/1979 | Craven et al. | 296/219 |
| 4,249,770 A | * | 2/1981 | Hunt | 296/218 |

FOREIGN PATENT DOCUMENTS

| | | |
|---|---|---|
| DE | 1580603 A1 | 7/1970 |
| DE | 1580603 B2 | 4/1973 |
| DE | 1580603 C3 | 11/1973 |
| GB | 413 116 A | 7/1934 |

OTHER PUBLICATIONS

Extended European Search Report dated Aug. 7, 2013, issued against European Application EP13001072.1.

* cited by examiner

*Primary Examiner* — Dennis H Pedder
(74) *Attorney, Agent, or Firm* — Fitch, Even, Tabin & Flannery, LLP

(57) ABSTRACT

The invention relates to a vehicle sliding roof device with a cover unit that is shiftably supported on guides of the sliding roof device by a support device and that can be adjusted between a closed position covering a roof opening and at least one open position, whereby it is provided in accordance with the invention that a locking device which detachably locks the cover unit at least in its closed position and that an arresting device with which the cover unit can be arrested from shifting relative to the guides at least in different opening positions can be activated by a manually operated activation device.

10 Claims, 16 Drawing Sheets

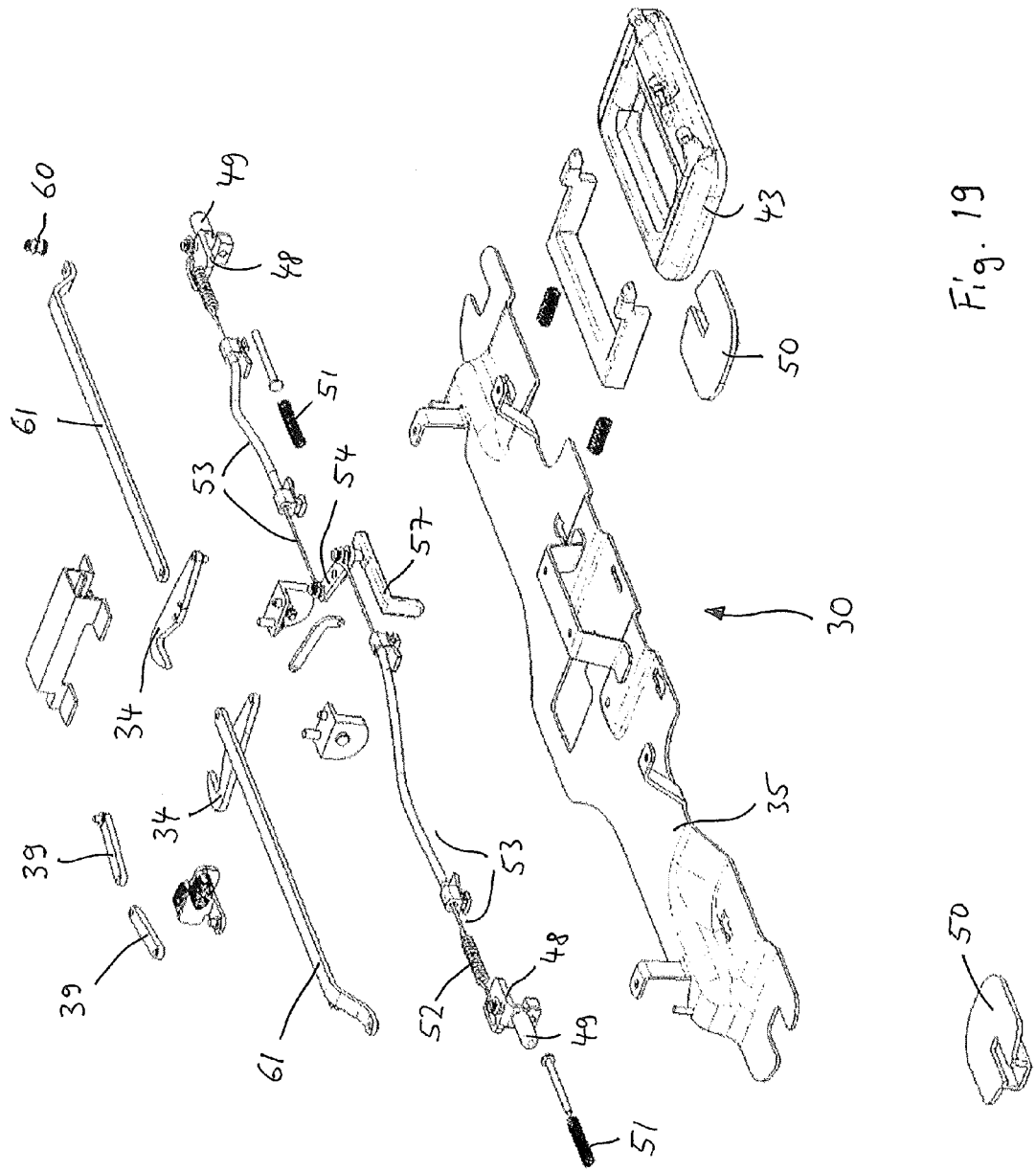

VEHICLE SLIDING ROOF DEVICE

CROSS REFERENCE TO RELATED APPLICATION

This application is a U.S. Utility which claims the benefit of foreign priority from European Application No. 13 001 072.1, filed Mar. 4, 2013, the entire disclosure of which is incorporated herein by reference in its entirety

FIELD

The invention relates to a vehicle sliding roof device with a cover unit that is shiftably supported on guides by a support device and that can be adjusted between a closed position covering a roof opening and at least one open position.

BACKGROUND

A generic vehicle sliding roof device is known from DE 1 580 603 B whose sliding roof cover can be adjusted by manually sliding it by a handle between a closed position and different open positions. Two actuation rods can be adjusted by the handle that extend to both side edges of the sliding roof cover and adjust two friction elements there that can fix the sliding roof cover in its particular position in frictional engagement in the area of lateral guides of the sliding roof cover. Such a frictional engagement does not make available a secure blocking of the sliding roof cover during a rather long operating time, in particular in case of a crash.

The invention is based on the problem of creating an initially cited vehicle sliding roof device that is improved as regards the adjusting of a movable cover unit and its fixing at different positions.

SUMMARY

This problem is solved in accordance with the invention for the initially cited vehicle sliding roof device in that a locking device which detachably locks the cover unit at least in its closed position and that an arresting device with which the cover unit can be arrested from shifting relative to the guides at least in different opening positions can be activated by a manually operated activation device.

Advantageous embodiments of the invention are indicated in the dependent claims.

The manually operated actuation device makes possible in particular the locking of the shiftable cover unit by one hand using the locking device in the closed position and an arresting fixing of the cover unit in certain sliding positions or arrested positions. The arrested positions advantageously contain a positive arresting engagement of the arresting device, as a result of which great holding forces against shifting the cover unit between the cover unit and a stationary structural part of the roof can be transmitted. Therefore, a cover unit arranged in an open position can be arrested and blocked at least after a short movement path even in the case of an accident in which high acceleration forces act on the cover unit and might shift it along the guides.

Such a safety mechanism is not offered, e.g., by the friction elements for fixing the cover unit that are known from the prior art because the frictional force that can be applied can be insufficient due to aging as well as to environmental influences, e.g., moisture.

The actuating device for the locking device as well as the arresting device is basically suitable for cover units that can be shifted manually or also moved by a drive device. Cover unit denotes every structural unit of a sliding roof that can close a roof opening with a planar closing element such as a cover or a panel.

The fixed roof part on which the arresting device can form an arresting engagement is, e.g., a roof frame structure to which the guides of the cover unit are attached, or a sliding roof frame of the sliding roof device, that is attached as a structural unit or sliding roof module by this sliding roof frame to the roof frame structure, or is a part of the guides.

Therefore, in the case of the sliding roof device in accordance with the invention the cover unit that is moved in particular manually along the guides can advantageously be fixed either by an arresting engagement of the arresting device present in a ready position, or it can freely shift on account of the arresting device that is held inactive by manual operation. Therefore, an easy opening or closing of the sliding roof unit can be carried out without intermediate arresting.

A preferred design provides that the actuating device is arranged on the cover unit and comprises an adjustably and in particular pivotably supported handle or the like that holds at least one bolt or bolt hook of the locking device in the bolted position on a bolt engagement part in its rest position, in which it is preferably pivoted into a horizontal position against the bottom of the cover unit, and in its actuating position, in which it is pivoted out downward from the horizontal position, it has released the bolt or bolt hook out of its locking. The bolt engagement part is stationarily attached, e.g., on a roof structural part as described above.

The arresting device advantageously contains at least one arresting component that is movably supported on the cover unit and can be adjusted on the side edge of the cover unit on at least one arresting engagement part arranged on the sliding roof frame by pretension in the arresting engagement, and in particular can be extended. The arresting component can be guided in a sliding or pivoting motion for its adjustment and it can be moved laterally in the plane of the cover unit or also vertically to it.

The arresting component can be adjusted by the actuation device by an adjusting unit comprising a Bowden wire into an inactive withdrawal position in which it cannot come into engagement with the arresting engagement part during the shifting of the cover unit. A Bowden wire can be readily adapted to the structural conditions as a means for transferring an adjusting movement. However, other mechanical transfer means such as guide rods and levers or the like are also suitable.

The adjusting unit and/or the Bowden wire can comprise a spring such as, e.g., a spiral traction-pressure spring that is provided inside the adjusting unit in particular for compensating tolerances.

The arresting device and/or the adjusting unit can preferably be operated by an arrest actuation part of the actuating device, that is, e.g., a slide or slide actuating part or also a pivotably supported part, whereby the arrest actuation part is preferably provided for shifting the cover unit manually with one hand and is therefore arranged adjacent to the handle or within a hand's reach for a simultaneous operation.

It is provided for a simple manner of operation that the arresting component can be moved in a position of readiness against a pretensioning force during a moved cover unit from an arresting bevel on the particular arresting engagement part and can be moved out by the pretensioning force in arresting engagement on the particular arresting engagement part.

The arresting component or an arresting component holder can be purposefully moved out by an arresting adjusting mechanism that can be adjusted by the actuation device, in particular by pivoting the handle on the one hand into a completely extended arresting position and on the other hand can be freed for moving into a withdrawn ready position. In the ready position the arresting component is in such a position or stands so far away from the cover unit that it can rest on the particular arresting bevel and can be adjusted by it.

Furthermore, an adjusting rod of the arresting adjusting mechanism can be provided that couples the adjustable bolt or bolt hook to the arresting component or to the arresting component holder. The arresting component or the arresting component holder can be additionally controlled or adjusted via the adjusting rod. An auto-actuation is not necessary by the connection to the bolt or to the bolt hook. The adjusting rod is advantageously supported on a crank or on an elongated hole of the arresting component holder so that in the ready position of the arresting component or of the arresting component holder it allows an adjusting movement of the arresting component holder limited by the crank or the elongated hole. The crank or the elongated hole are cited by way of example but the function can also be made available by other means. The adjusting rod makes possible, e.g., the manually actuated extension of the arresting component into an arresting engagement part in an intermediate or in an end position of the cover unit in which the roof opening is closed, partially freed or entirely open.

The locking device and the arresting device as well as the actuating device can form a structural group that can be arranged on the cover unit or on a cover of the cover unit. An assembly is facilitated if the structural group comprises a carrier structure that can be attached, for example by screws or adhesive, on the bottom of the cover unit or of the cover, in particular in the vicinity of the front edge of the cover.

A preferred design provides that the cover unit comprises a cover frame that is supported on the guides of the sliding roof device or the cover unit and to which the cover with the structural group attached to it is detachably attached for freeing a roof- or cover frame opening. Therefore, a roof opening can be readily freed with a large surface that otherwise is covered, even in its open position, by a part of the shifted cover, in particular by the front part with the actuation device.

BRIEF DESCRIPTION OF THE DRAWINGS

The invention is explained in detail in the following using an exemplary embodiment of a vehicle sliding roof device in accordance with the invention with reference made to the drawings. In the drawings:

FIG. 19 shows an isometric top view in an exploded view of the structural group shown in FIG. 8.

DETAILED DESCRIPTION

Figure 1:
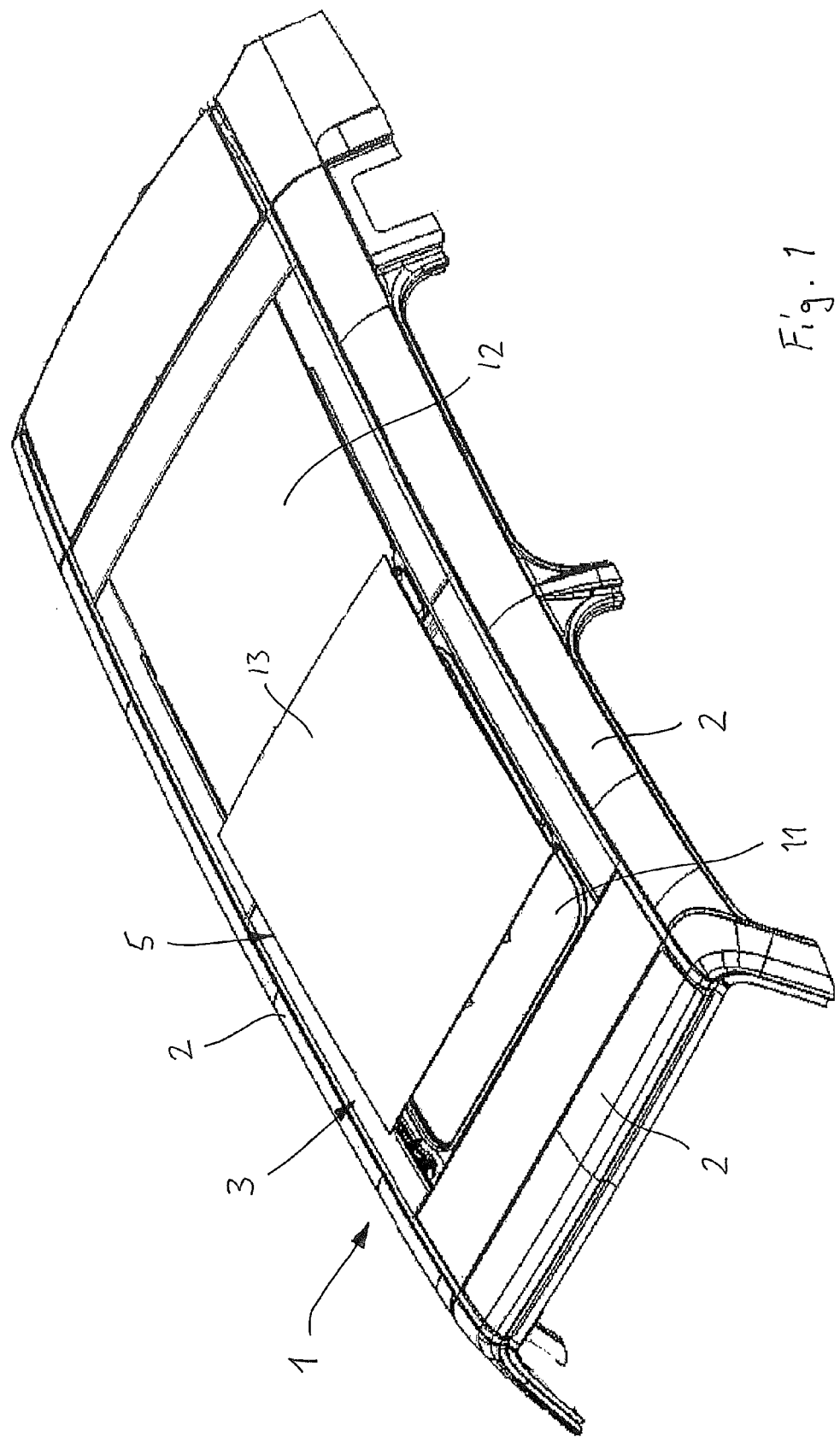
FIG. 1 shows an isometric top view onto a vehicle roof with a sliding roof device whose cover unit was moved into a partial open position.
Figure 2:
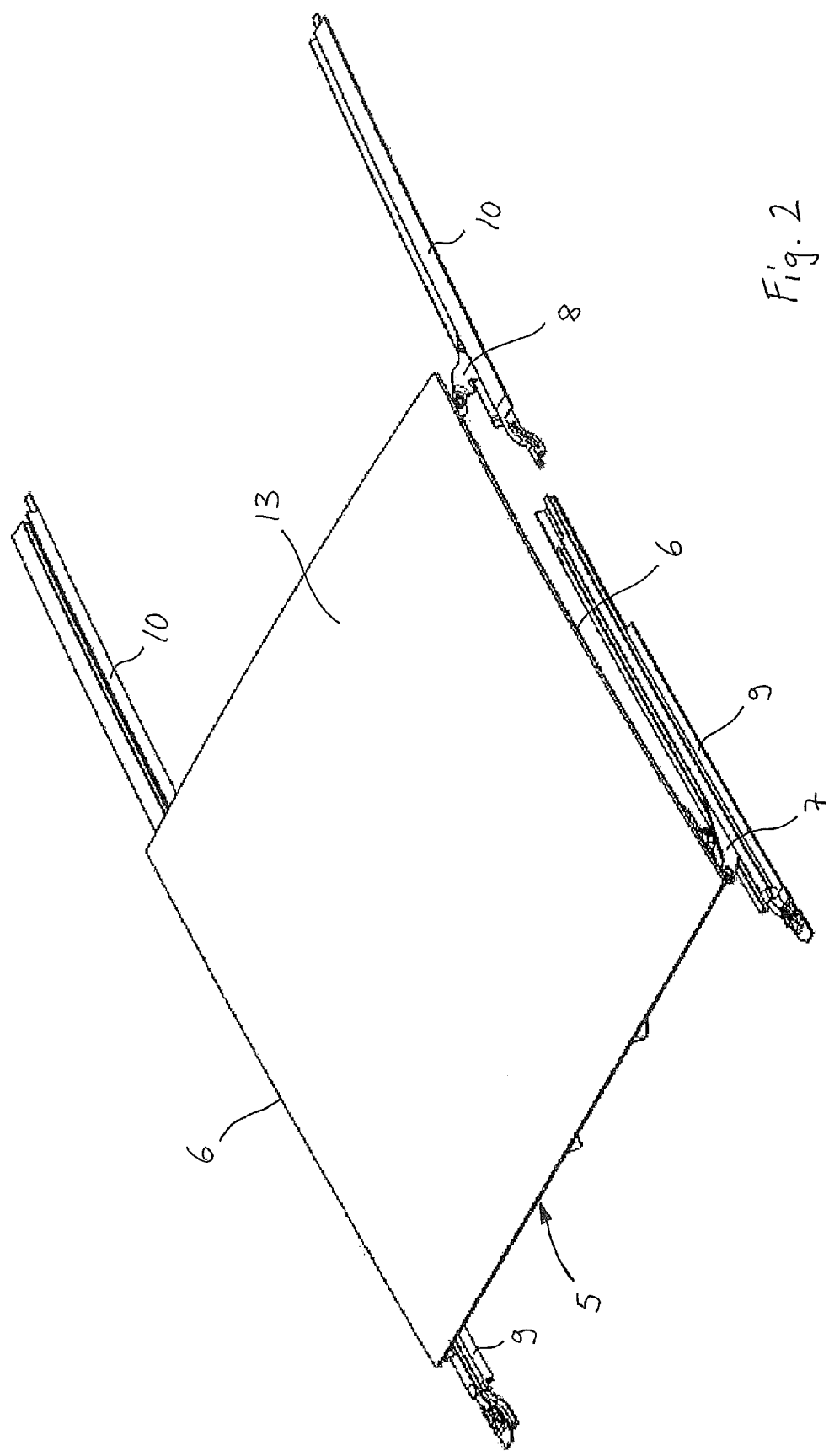
FIG. 2 shows an isometric top view of the cover unit in the position of FIG. 1 with its support on lateral front and rear guide rails.
Figure 3:
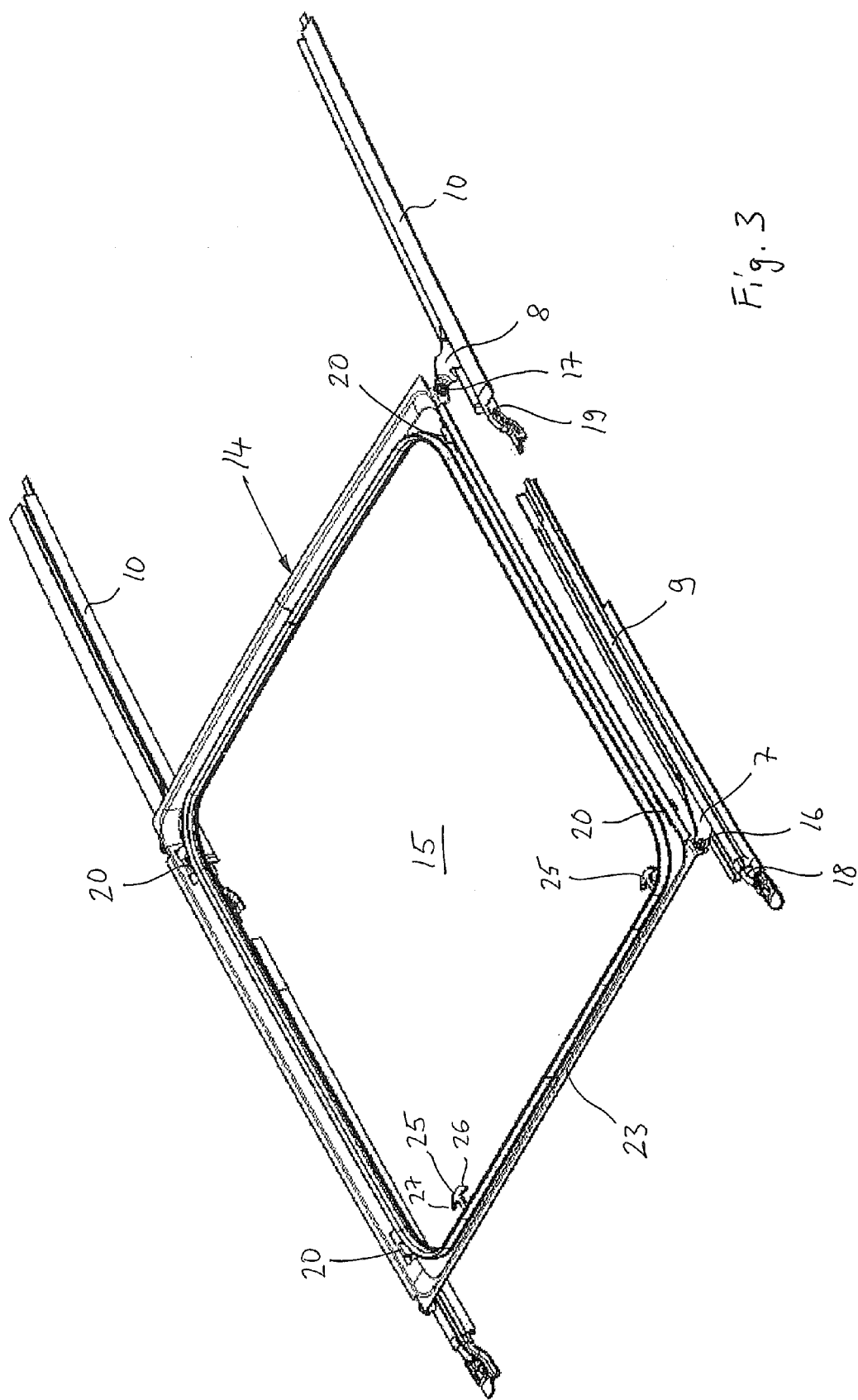
FIG. 3 shows an isometric top view in accordance with FIG. 2 of a cover frame of the cover unit with its support on the lateral front and rear guide rails.
Figure 4:
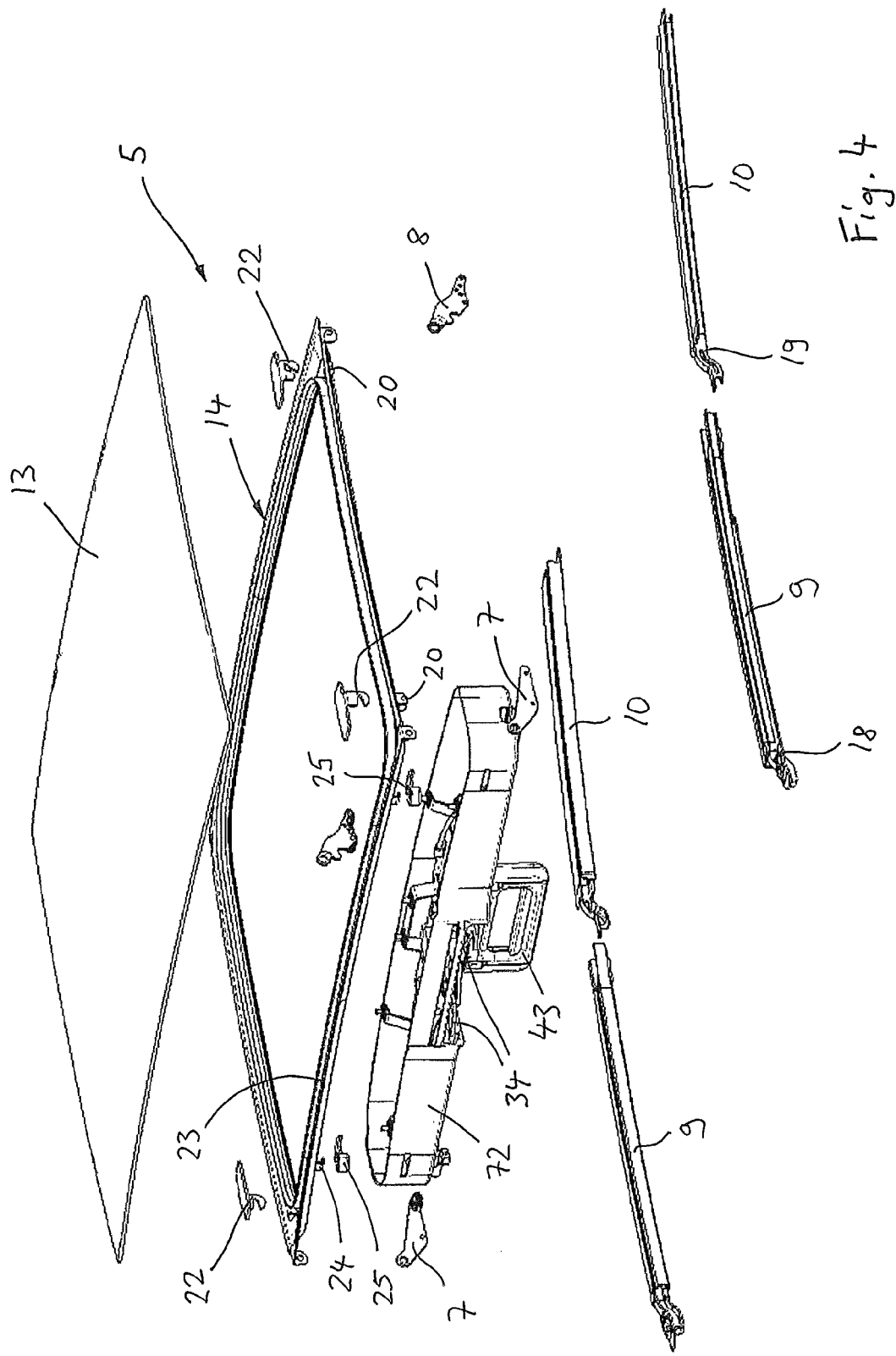
FIG. 4 shows an isometric top view in an exploded view of the sliding roof device.
Figure 5:
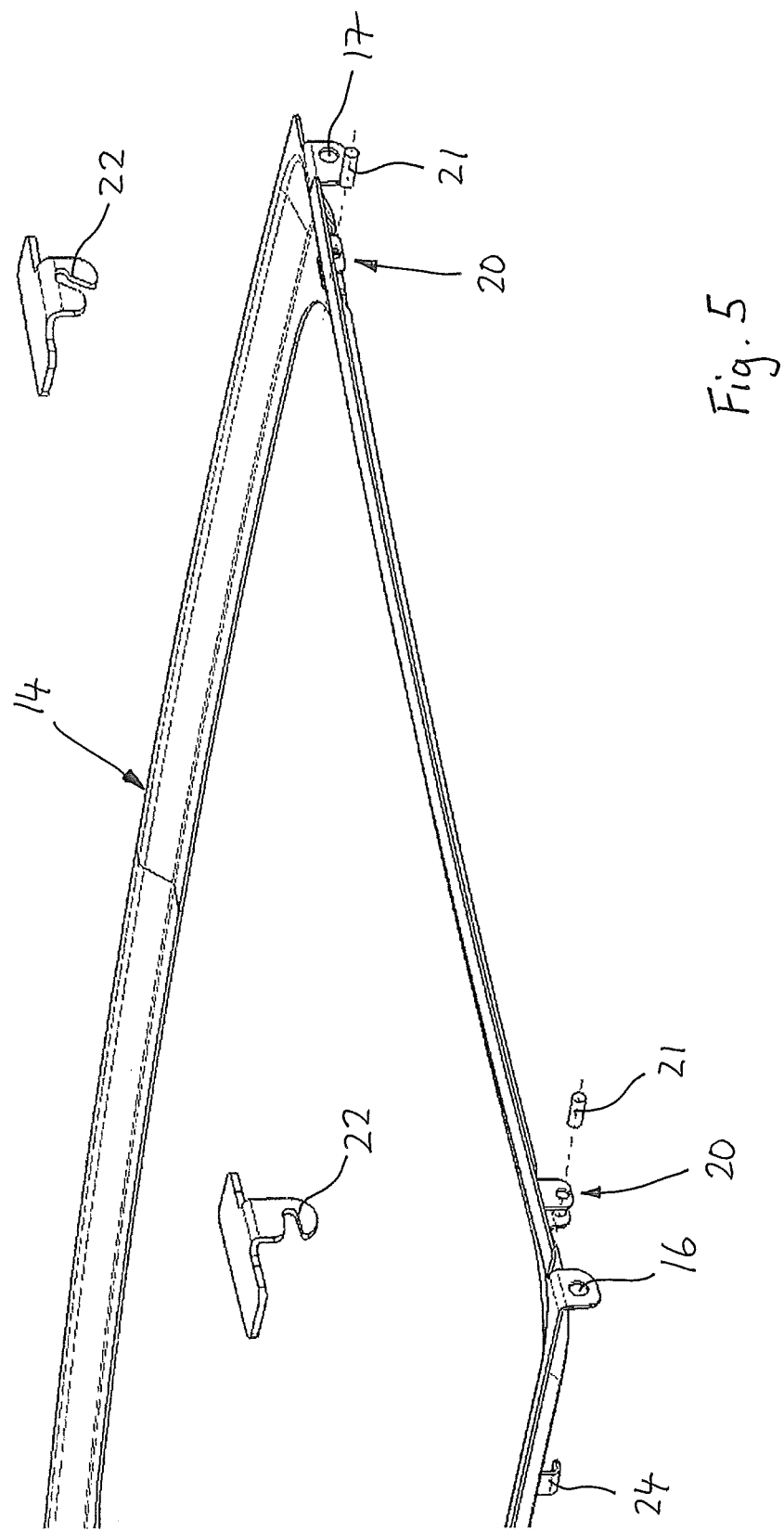
FIG. 5 shows an isometric top view in an exploded view of a left-side section of the cover frame with two cover holders and associated frame-side holding pins.
Figure 6:
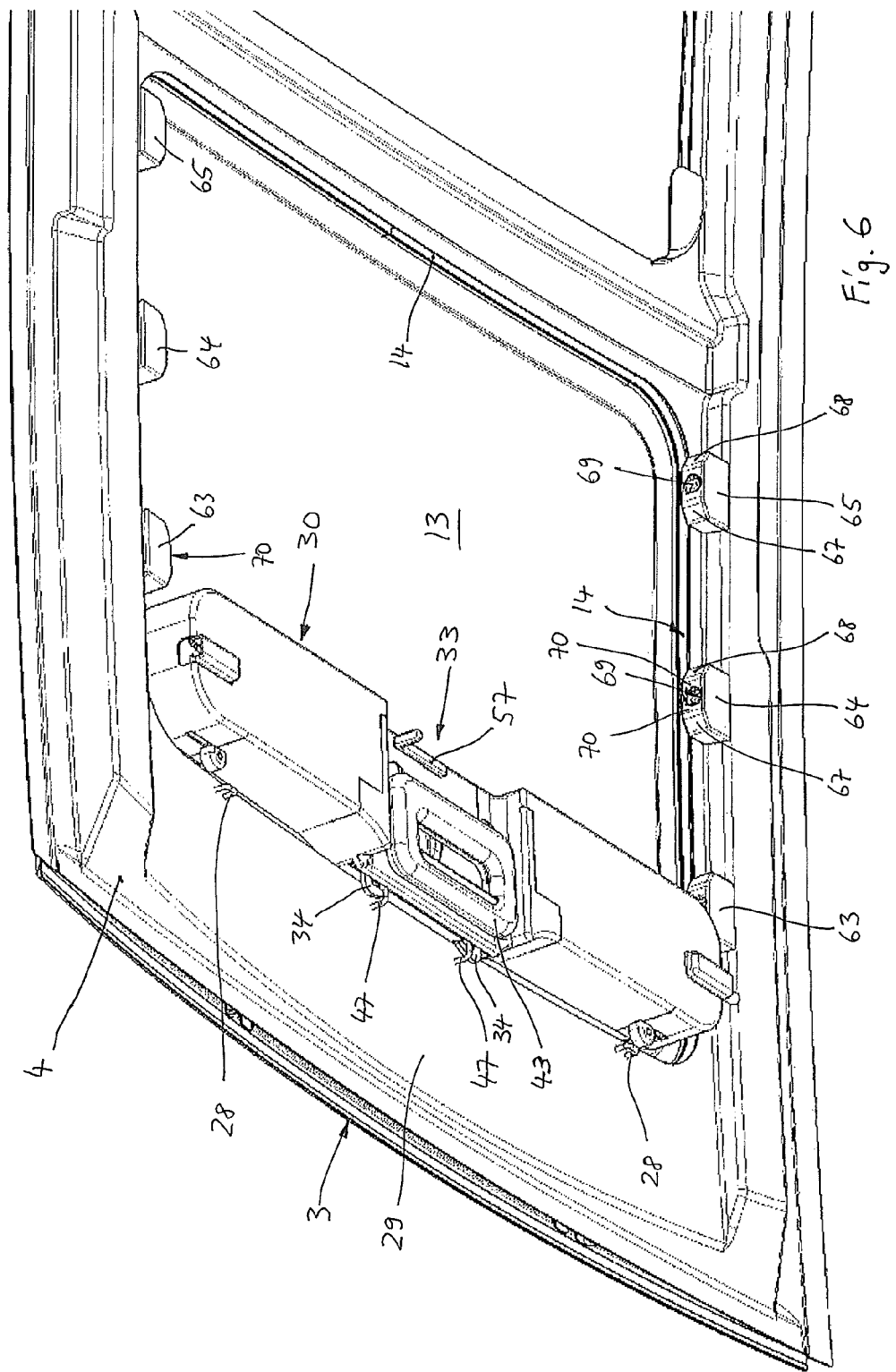
FIG. 6 shows an isometric top view of a bottom of the sliding roof device, whereby the cover unit comprising an actuation device is arranged in the closed position.
Figure 11:
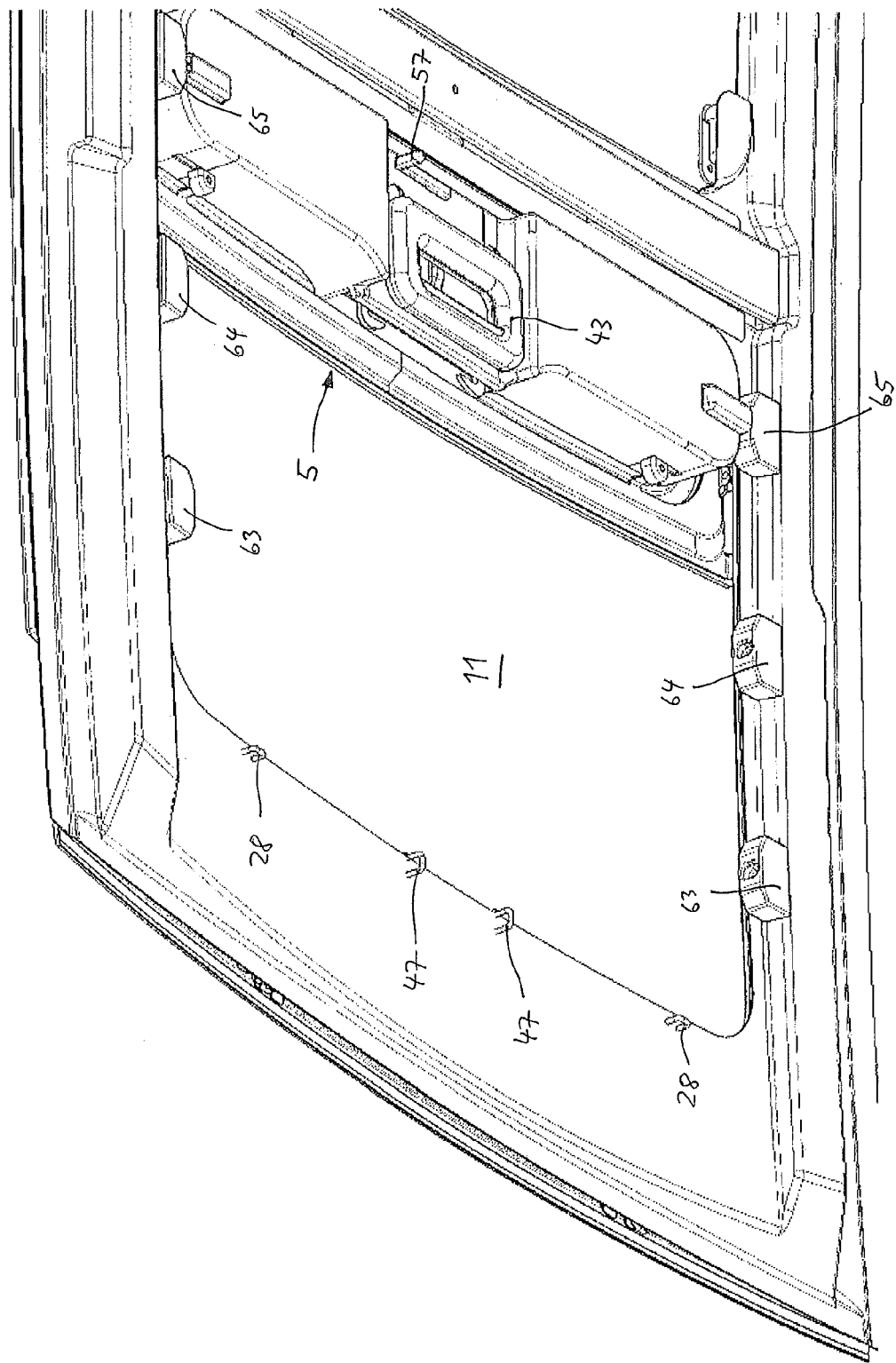
FIG. 11 shows an isometric top view in accordance with FIG. 10 of the sliding roof device, whereby the cover unit is locked in the rear open position by the actuation device.

A vehicle such as, e.g., a passenger car comprises a vehicle roof 1 (see FIG. 1) with a fixed roof frame structure 2 and a sliding roof device 3 attached as a structural unit by a sliding roof frame 4 (see FIG. 6) to the roof frame structure 2. The sliding roof device 3 contains a movable cover unit 5 that is shiftably supported on a front guide rail 9 and on a rear guide rail 10 in the area of its two side edges 6 by a front support- and swing-out lever 7 and by a rear support and swing-out lever 8 (see especially FIGS. 2 to 4) respectively. The cover unit 5 can shift between a closed position in which a roof opening 11 that can be opened is closed (FIG. 6) and an open position with maximally opened roof opening 11 (FIG. 11), whereby upon a shift into intermediate positions with partially open roof opening 11 as well as in the open position the support- and swing-out levers 7 and 8 raise the cover unit 5 and shift it over a rear roof surface part 12 that follows the roof opening 11 and the closed cover unit 5 to the rear. This roof surface part 12 can be, e.g., a part of a fixed roof, an inserted, fixed covering or also another movable cover. The shifting of the cover unit 5 along the guide rails 9 and 10 takes place manually but can also basically be carried out by a drive device.

The axial and directional designations such as, e.g., "front", "side", "above" and "below" used in the description refer to a three-dimensional x-y-z vehicle coordinate system. The exemplary embodiment shows a sliding roof device with a cover unit 5 that can be shifted in the longitudinal direction of the vehicle or the x direction or in the longitudinal direction of the roof. However, a sliding roof design in accordance with the invention can also be provided with a cover unit arranged so that it can move, e.g., in the transverse direction of the vehicle or the y direction or in the direction transverse to the roof.

The cover unit 5 comprises a cover 13, e.g., a glass cover or a plastic cover, and a cover frame 14 to which the cover 13 is detachably attached. The cover frame 14 runs circumferentially under the edge area of the cover 13 and is therefore a substantially rectangular structural component with a large cover frame opening 15 in the exemplary embodiment corresponding to the shape of the cover. The front and rear support- and swing-out levers 7 and 8 are pivotably articulated to the cover frame 14 in front and rear pivot bearings 16 and 17 and can be raised and lowered by guide- and control cranks 18 and 19 of the guide rails 9 and 10 and can be moved along them.

The cover frame 14 comprises four holders 20 with support pins 21 associated with hooks 22 that are attached to the bottom of the cover 13 and project downward. The cover 13 is detachably attached to the cover frame 14 in that it is suspended by the two front hooks 22 on the front support pins 21 and by the rear hooks 22 on the rear support pins 21.

Figure 18:
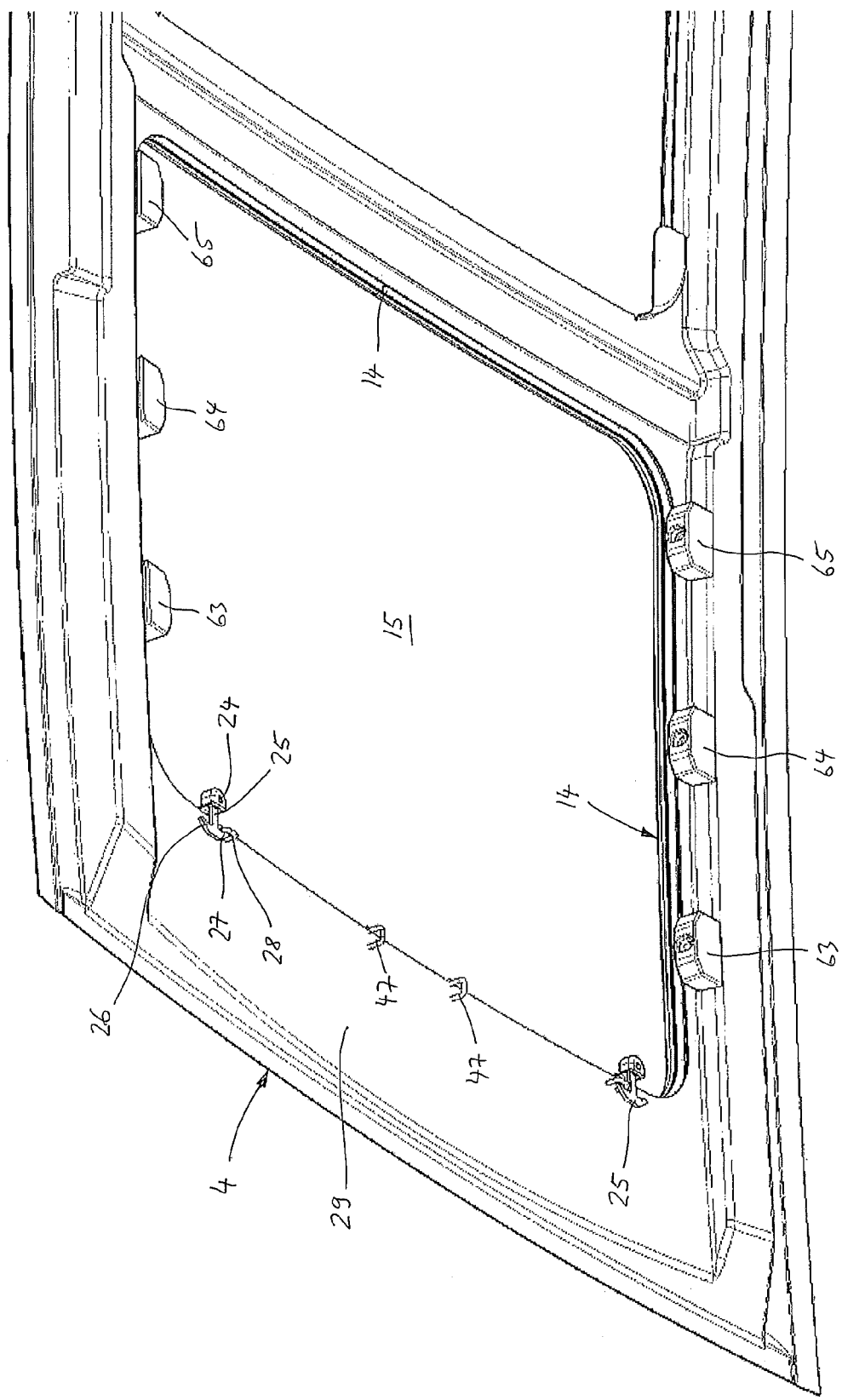
FIG. 18 shows an isometric top view in accordance with FIG. 6 of the sliding roof device with a cover frame of the cover unit, which cover frame is arranged in the closed position, from which the cover that can be releasably attached to the cover frame has been removed.

The cover frame 14 contains two supports or support pegs 24 on its front cover transverse frame part 23 that especially project downward and pivotably support a bolt part 25. Each bolt part 25 is shaped like an anchor with two opposing bolt hooks 26 and 27 and can be pivoted in such a manner about the support pin 24 that in a first bolting position the bolt hook 26 is in engagement with an engagement part (not shown, e.g., a peg or a pin) of the cover 13 and securely holds the cover 13 on the cover frame 14 (see, e.g., FIG. 6). The bolt part 25 can be pivoted from this first bolting position in the opposite direction into a second bolting position, e.g., manually (see FIG. 18), in which the bolt hook 27 is brought into engagement with an engagement part 28 arranged on a front transverse frame part 29 of the sliding roof frame 4. Therefore, in this second bolting position the bolt part 25 locks the cover frame 14 in the closed position on the sliding roof frame 4 and at the same time releases the lock of the cover 13 on the cover frame 14 so that the cover 13 can be removed from the secured, non-shiftable cover frame 14 and the cover frame opening 15 forms the free roof opening 11.

Figure 7:
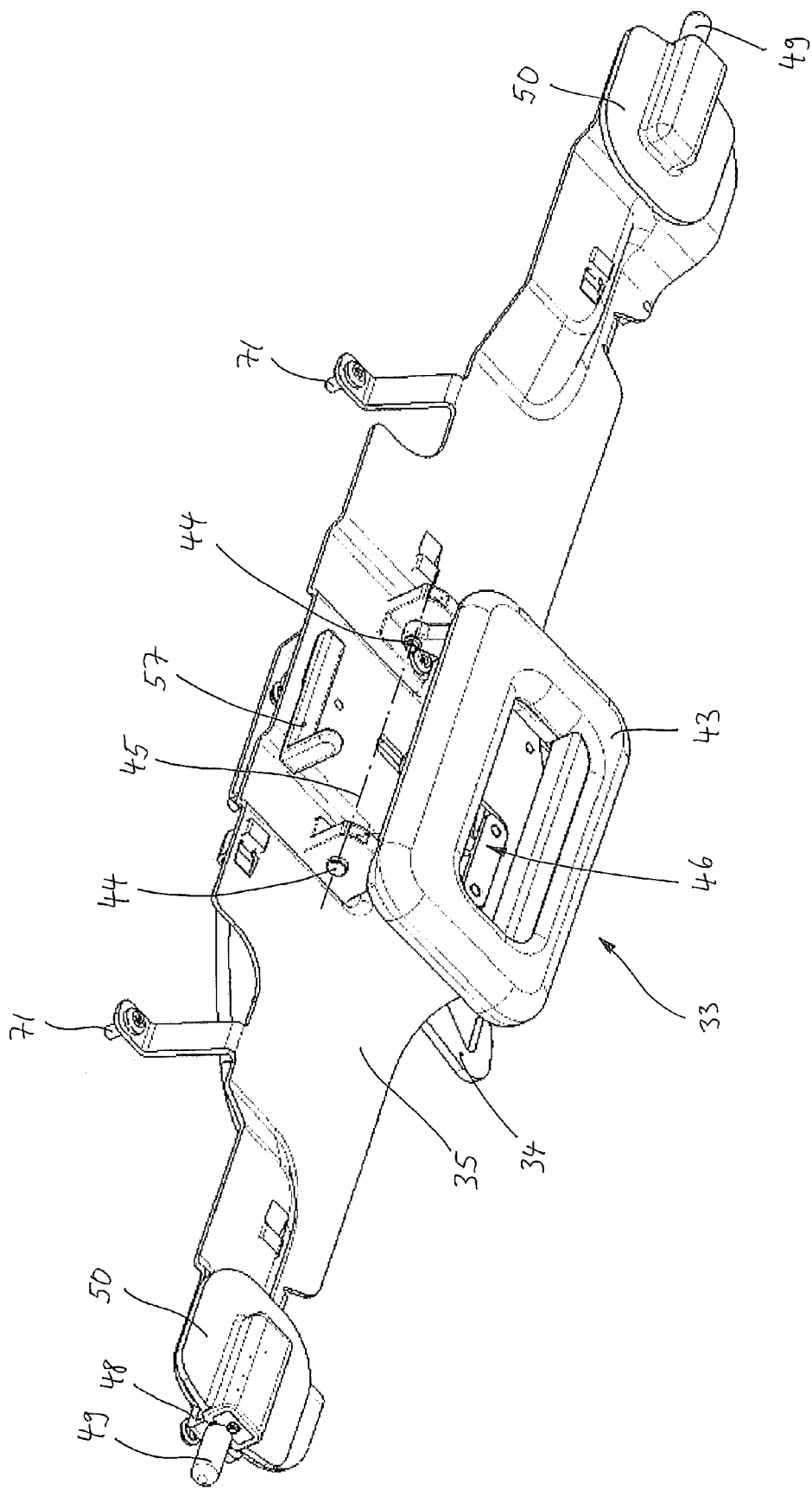
FIG. 7 shows an isometric top view of a bottom of the actuation device.
Figure 8:
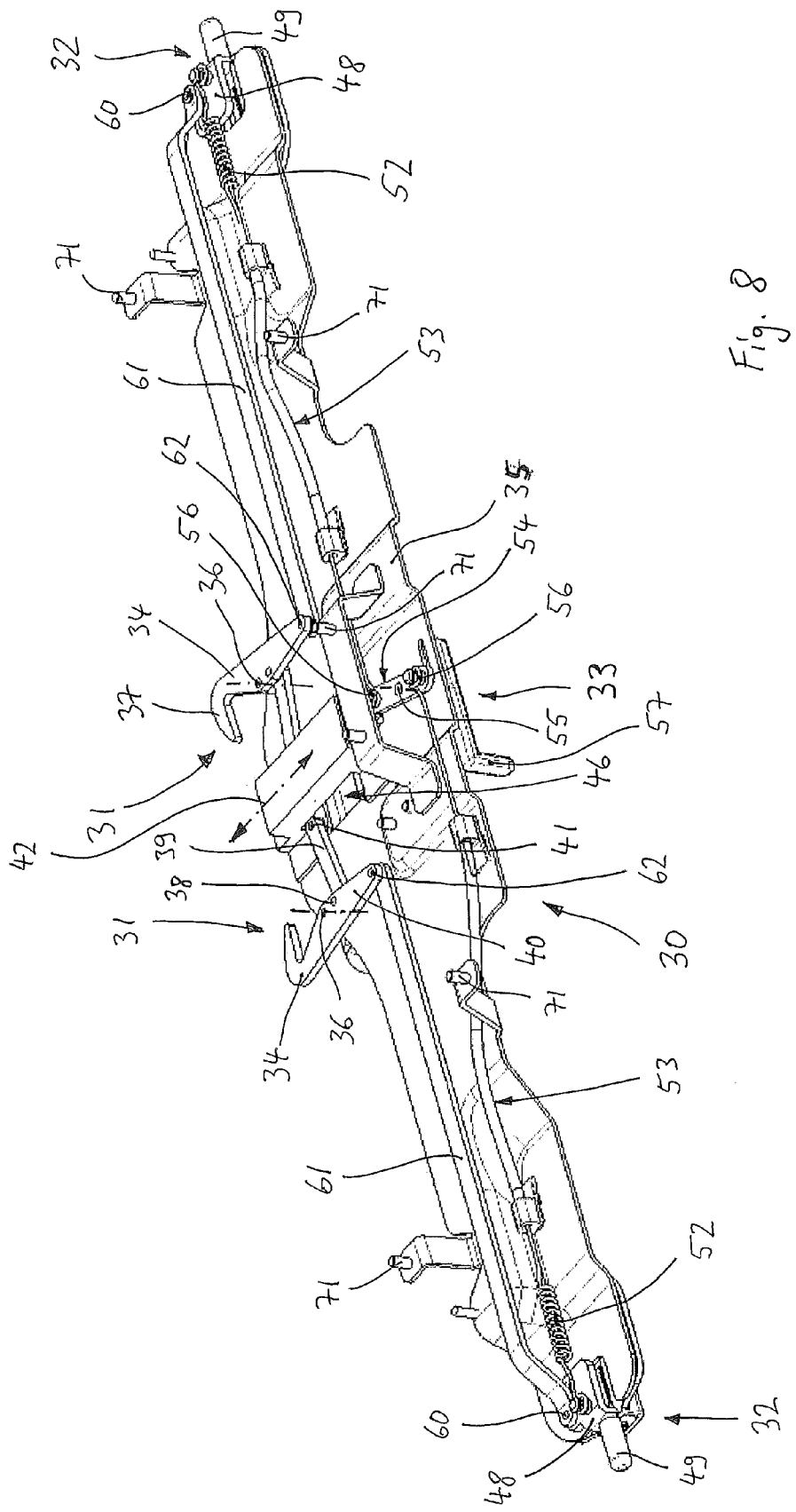
FIG. 8 shows an isometric top view of the top of the actuation device with a locking device and with an arresting device.
Figure 9:
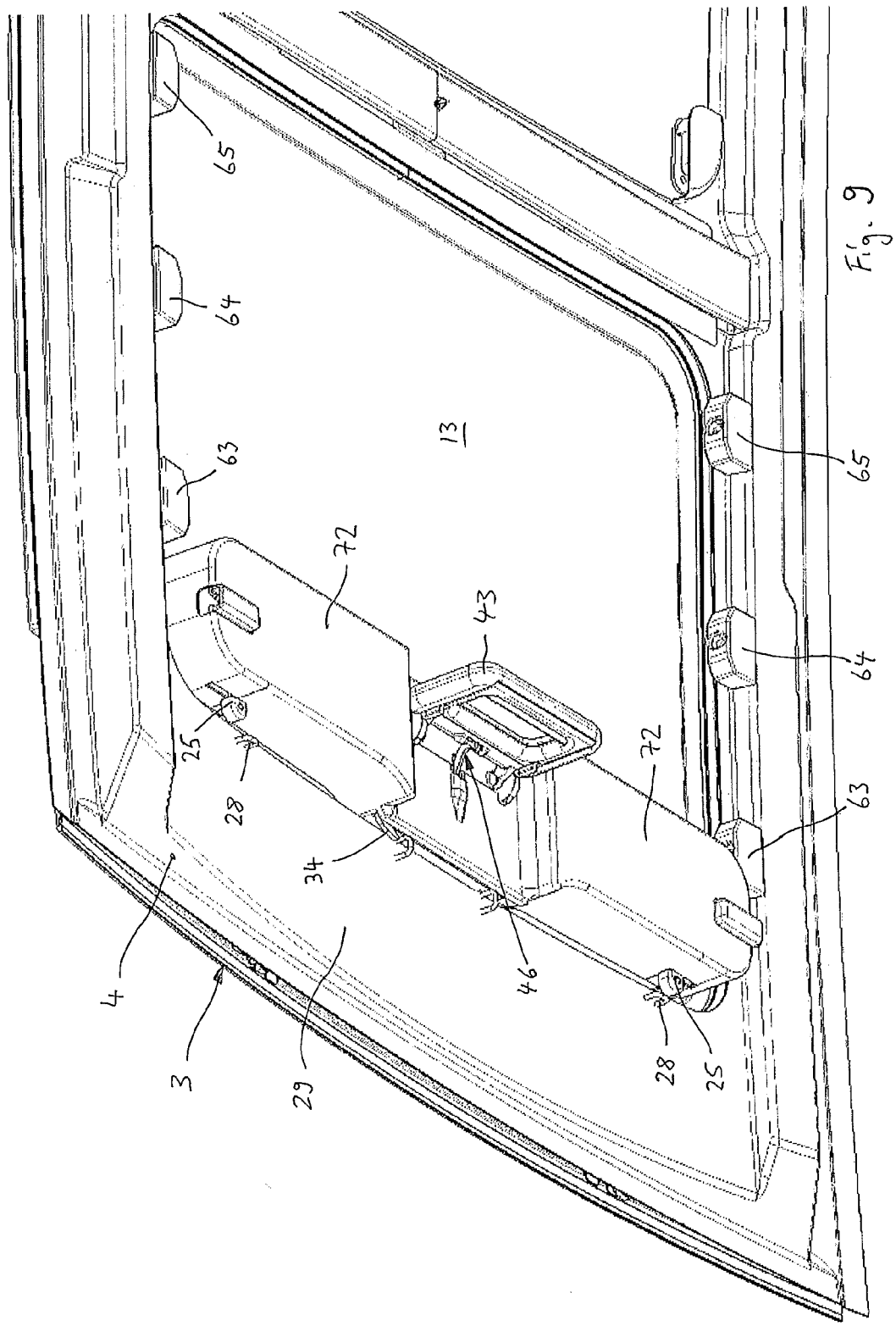
FIG. 9 shows an isometric top view in accordance with FIG. 6 of the sliding roof device, whereby the actuation device unlocks the locking device when the cover unit is closed and has moved the arresting device into a ready position.

A structural group 30 is arranged on the bottom of the cover 13 (FIGS. 4, 7 and 8) which group comprises a locking device 31, an arresting device 32 and an actuation device 33 for actuating and shifting the cover unit 5 as well as for actuating the locking device 31 and the arresting device 32. The locking device 31 comprises two bolt hooks 34 that are pivotably supported on a one-part or multi-part carrying component 35 of the structural group 30 by a pivot support 36 and on both sides relative to a vertical longitudinal central plane through the structural group 30 and the cover unit 5 and are therefore arranged at a distance from one another. A front hook end 37 of each bolt hook 34 extends forward from the pivot support 36. An articulation 38 of a correcting element 39 of an actuating mechanism is arranged on a section 40 of the bolt hook 34, which section is at the rear relative to the pivot support 36. The actuation of the two bolt hooks 34 in a simultaneous opposite pivoting takes place via the longitudinal shifting of an inner articulation 41 of the particular correcting element 39 in the longitudinal direction of the roof (shown in FIG. 8 by double arrow 42) by a handle 43 that can pivot by two supports 44 about a transverse pivot axis 45 on the carrier component 35 through approximately 90° and the intercalated actuation mechanism 46 in such a manner that in the horizontal rest position of the handle 43, which position is pivoted in against the carrier component 35 (see the FIGS. 6 and 7), the two bolt hooks 34 are pivoted against one another into a locking position and in a pivoted-out operating position of the handle 43 (see the FIGS. 4, 9 and 10) they are pivoted out of the bolted position into an open position. In the bolted position the bolt hooks 34 are in a bolting engagement with a closed cover unit 5 (FIG. 6) on an associated bolting engagement part 47 on the front transverse frame part 29 of the sliding roof frame 4 so that the cover unit 5 cannot be moved out of its closed position.

Figure 13:
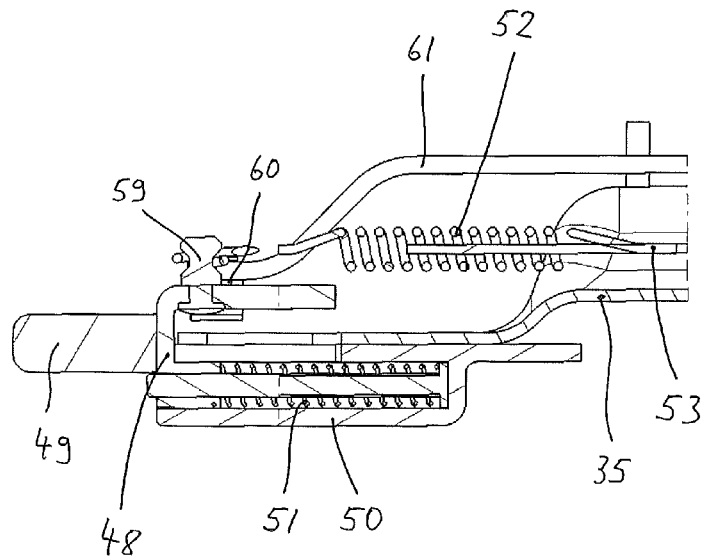
FIG. 13 shows the arresting device in a sectional view along the line A-A in FIG. 12.

The arresting device 32 contains an arresting pin holder 48 with a laterally outwardly projecting arresting pin 49 on the two lateral ends of the carrier component 35. The arresting pin holder 48 is shiftably supported in the transverse direction or y direction on a support unit 50 attached on the carrier component 35 and is outwardly pretensioned into an outer position of rest by a pressure spring 51 received in a recess of the support unit 50 (see FIG. 13). Each arresting pin holder 48 is connected by a Bowden wire 53 containing a spring 52 to a pivot lever 54 (FIG. 8) that is supported in such a manner that it can pivot about a pivot shaft 55 centrally arranged on the carrier component 35 and that comprises connection points 56 for the two Bowden wires 53, that oppose one another relative to the pivot shaft 55 and are therefore uniformly spaced.

A slide actuating part 57 of the actuation device 33 is arranged on the bottom of the carrier component 35 in the vicinity of the handle 43 and is shiftably supported in the transverse direction or y direction on the carrier component 35. The slide actuating part 57 is coupled to the one arm of the pivoting lever 54 at a distance to the pivot shaft 55, e.g., by a pin connection or bolt connection on the connection 56 of the one Bowden wire 53. When the slide actuating part 57 is manually moved in the transverse or y direction to the right from the position shown in FIG. 8, the arresting pin holders 48 with the arresting pins 49 are drawn inward in a synchronous withdrawal motion contrary to the force of the pressure springs 51 by the pivot lever 54 that also pivots and by the two Bowden wires 53.

Figure 14:
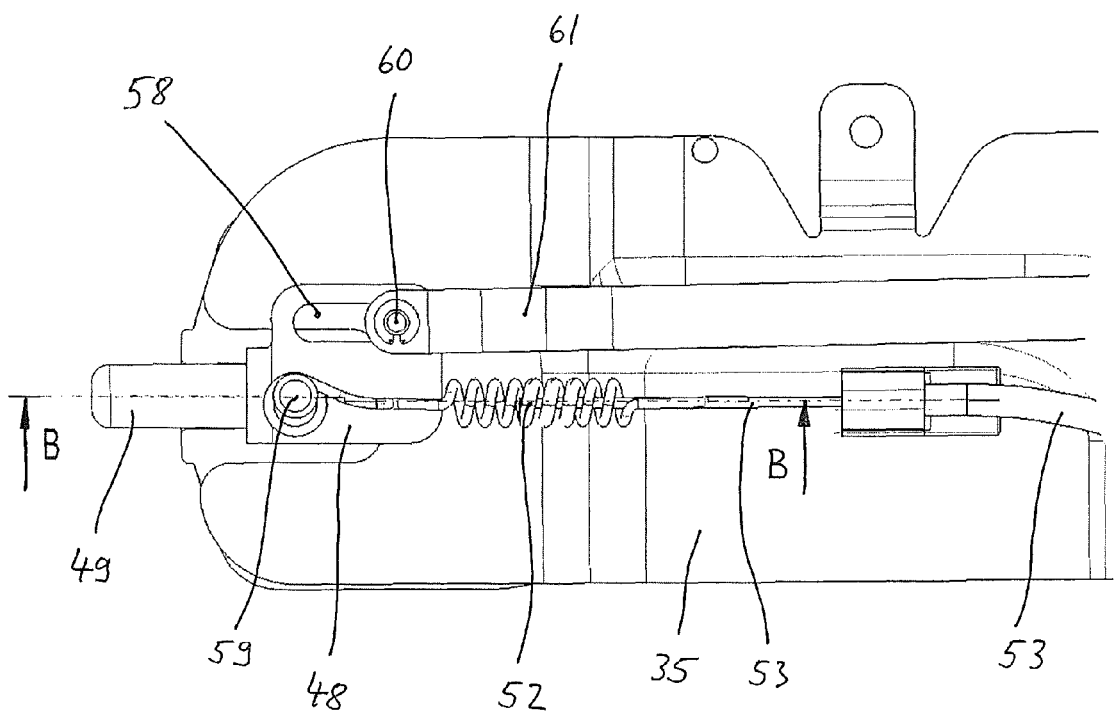
FIG. 14 shows a top view in accordance with FIG. 12 of the actuation device with the arresting device in a ready position in accordance with FIG. 9.

The arresting pin holder 48 comprises an oblong hole 58 (see FIG. 14) that extends next to the connection 59 of the Bowden wire 53 and its spring 52 in the direction of movement of the arresting pin holder 48 or in the y direction. A support pin 60 is shiftably received in the oblong hole 58. The support pin 60 is fastened on the outer end of an adjusting rod 61 and holds the adjusting rod 61 as a sliding bearing in a movable manner relative to the arresting pin holder 48, whereby the movement path is limited by the length of the oblong hole 58. The adjusting rod 61 extends inward up to the bolt hook 34 and is connected to it by a connecting articulation 62 arranged on the rear end of its rear section 40.

The arresting pins 49 are provided for the arresting engagement on, for example, three arresting engagement parts 63, 64 and 65, that are arranged on lateral longitudinal frame parts 66 of the sliding roof frame 4 along the movement path of the cover unit 5. Each arresting engagement part 63, 64 and 65 comprises a front arresting bevel 67 and a rear arresting bevel 68 on which the arresting pin 49 can slide during the shifting movement of the cover unit 5 in accordance with the direction of movement of the cover unit 5 and can move thereby inward as well as outward in the cross- or y direction. Furthermore, each arresting engagement part 63, 64 and 65 contains an arresting recess 69, that is cylindrical in particular, in a sliding surface 70 between the two arresting bevels 67 and 68. The arresting recess 69 is formed in such a manner that the arresting pin 49 sliding over the sliding surface 70 can move out into the arresting recess 69 on account of the pretension by the pressure spring 51. In its extended arresting position the arresting pin 49 blocks the cover unit 5 in this position (see, e.g., FIGS. 10 and 11) even if the cover unit 5 should be pushed, e.g., manually further.

The method of operation of the sliding roof device is described in the following.

Figure 12:
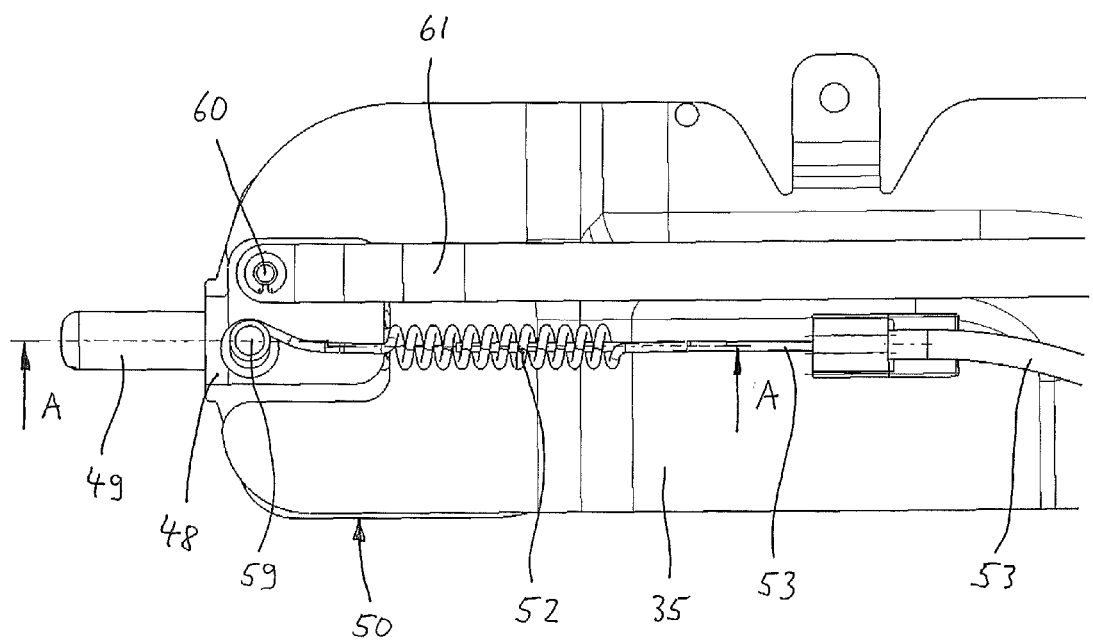
FIG. 12 shows a top view of a left end section of the actuation device shown in FIG. 8 with the arresting device in an extended arresting position.

In the closed position of the cover unit 5 (see FIG. 6) the cover 13 closes the roof opening 11 flush with the surrounding roof surface. The handle 43 is pivoted into its position of rest and the two bolt hooks 34 are pivoted by the actuation mechanism 46 into their bolting positions with a bolting engagement on the bolt engagement parts 47. The adjusting rods 61 were moved outward via the bolt hooks 43 and press the arresting pin holder 48 with the arresting pin 49 in a forced engagement on the outer end of the oblong hole 58 into a maximal outer position (see position of the FIGS. 12 and 13, arresting pin not shown in FIG. 6). In this position the arresting pin holder 48 has moved the pivot lever 54 and/or the slide actuating part 57 via the Bowden wire 53 against a stop and furthermore expanded the spring 52 under a buildup of tension. According to the exemplary embodiment an arresting engagement with arresting engagement parts is not provided in this position. The cover 13 is fastened on the cover frame 14 by the hooks 20 on the holders 22 and is in engagement with engagement parts of the cover 13 by the pivoted-back bolt parts 25 and the bolt hooks 26 so that the cover 13 is securely held on the cover frame 14.

Figure 15:
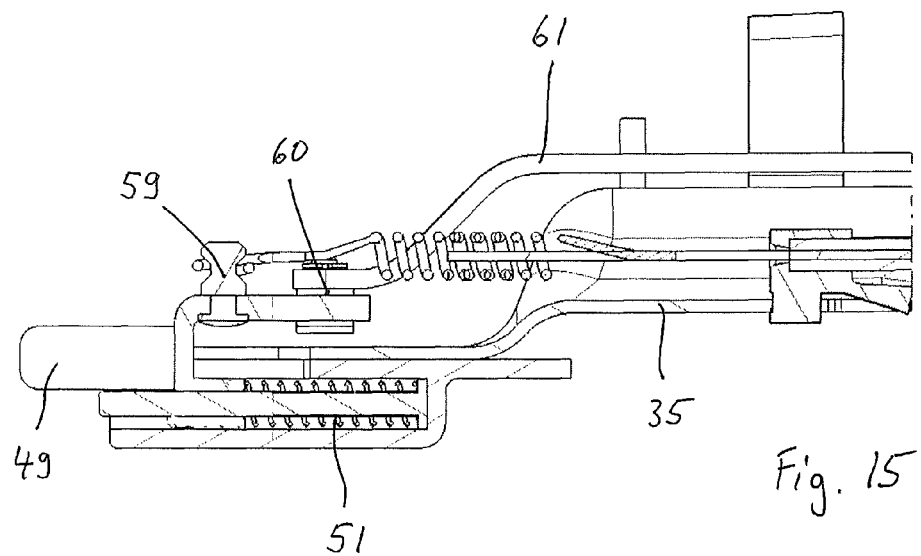
FIG. 15 shows the arresting device in a sectional view along the line B-B in FIG. 14.
Figure 17:
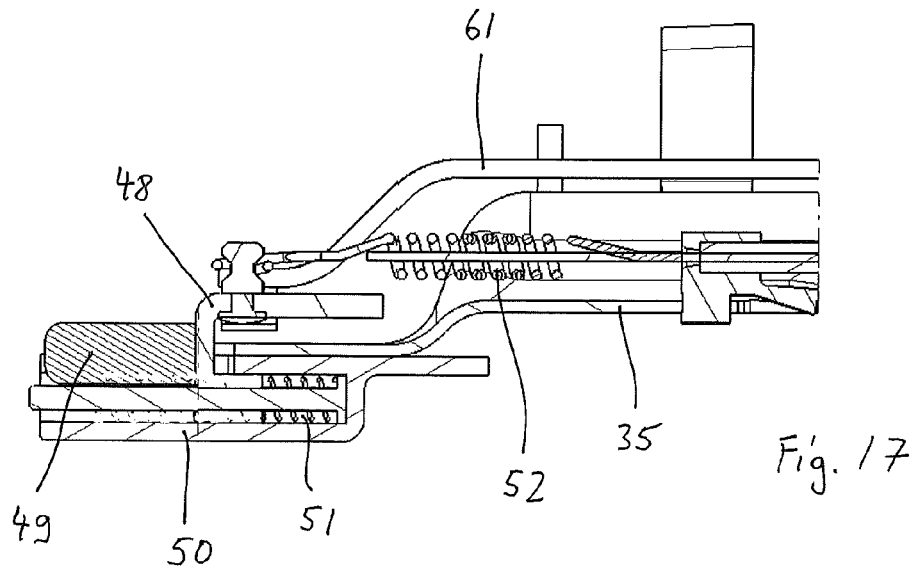
FIG. 17 shows the arresting device in a sectional view along the line C-C in FIG. 16.
Figure 16:
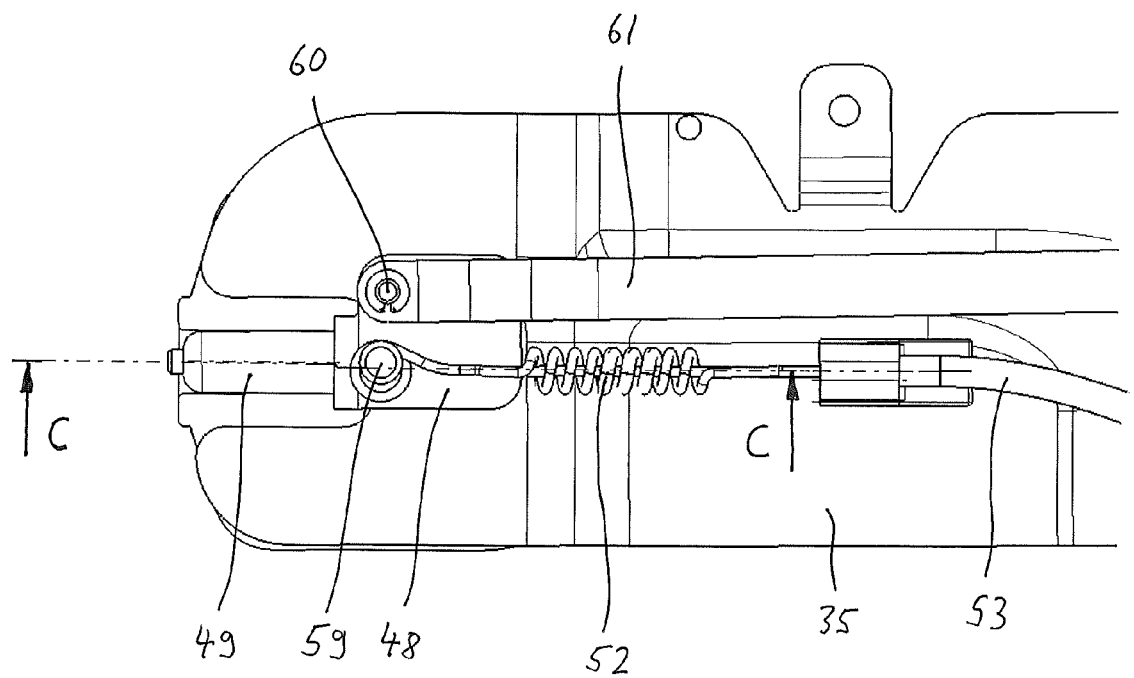
FIG. 16 shows the actuation device with the arresting device in a withdrawal position in a top view in accordance with FIG. 12.

In order to open the sliding roof device 3, at first the handle 43 is pivoted down (see FIG. 9), as a result of which the bolt hooks 34 are pivoted into their open position and the cover unit 5 is freed for shifting longitudinally along the guide rails 9 and 10. Moreover, the adjusting rods 61 are drawn inward into the position shown in the FIGS. 14 and 15, whereby initially the arresting pin holder 48 follows the support pin 60 of the adjusting rod 61 by the force of the tensioned spring 52, which pin rests on the outer end of the oblong hole 58 until the spring 52 has shortened to its unexpanded length free of spring power and exerts no return force on the arresting pin holder 48. The support pin 60 of the adjusting rod 61 is then located on the inside end of the oblong hole 58 of the arresting pin holder 48, that continues to be pretensioned to the outside by the pressure spring 51, whose spring power is less than the spring power of the spring 52 of the Bowden wire 53. In this position the arresting pin 49 is in a ready position in which it comes in contact with the front arresting bevel 67 during the backwards-directed manual shifting of the cover unit 5 and is shifted inwards by this arresting bevel against the power of the pressure spring 51 to the level of the sliding surface 70. The arresting pin holder 48 moves at this time relative to the arresting support pin 60, that is again moved in the oblong hole 58 toward its outer end (position of the arresting pin holder 48 shortly in front of the moving-in position shown in the FIGS. 16 and 17). The Bowden wire 53 forms with the relaxed spring 52 a largely pressure-stiff unit and is shifted inward by the arresting pin holder 48, as a result of which it pivots the pivot lever 54 and the slide actuating part 57 is also shifted.

During the further shifting movement of the cover unit 5 the arresting pin 49 reaches the arresting recess 69 into which it is extended by the spring power of the pressure spring 51 and pressed in. The arresting device 32 reassumes the position shown in the FIGS. 14 and 15 and the arresting pin 49 blocks the cover unit 5 in its extended arresting position against further shifting (position according to the FIGS. 10 and 11). The pivot lever 54 has been pivoted back again via the also shifted Bowden wire 53 and the slide actuating part 57 is also located back in its initial position.

In order to shift the cover unit 5 further by the handle 43, the slide actuating part 57 arranged in the vicinity of the handle 43 is manually activated or shifted, as a result of which the arresting pin 49 is drawn out of the arresting recess 69 by the pivoting pivot lever 54 and the Bowden wire 53 with the spring 52. After the arresting engagement has been ended, the cover unit 5 can be shifted further by the handle 43. The activation of the slide actuating part 57 can be ended.

The described procedure is repeated at each of the following arresting engagement parts 64 and 65. In order to move the cover unit 5 into the open position according to FIGS. 10 and 11 without the described interruption of movement or arresting at at least one of the arresting engagement parts 63, 64 or 65 the slide actuating part 57 can be completely activated or shifted during the opening movement already upon reaching the first arresting engagement part 63 and held in the position so that the arresting device 32 and in particular the arresting pin 49 assume the withdrawn position shown in the FIGS. 16 and 17 in which no arresting can take place.

Figure 10:
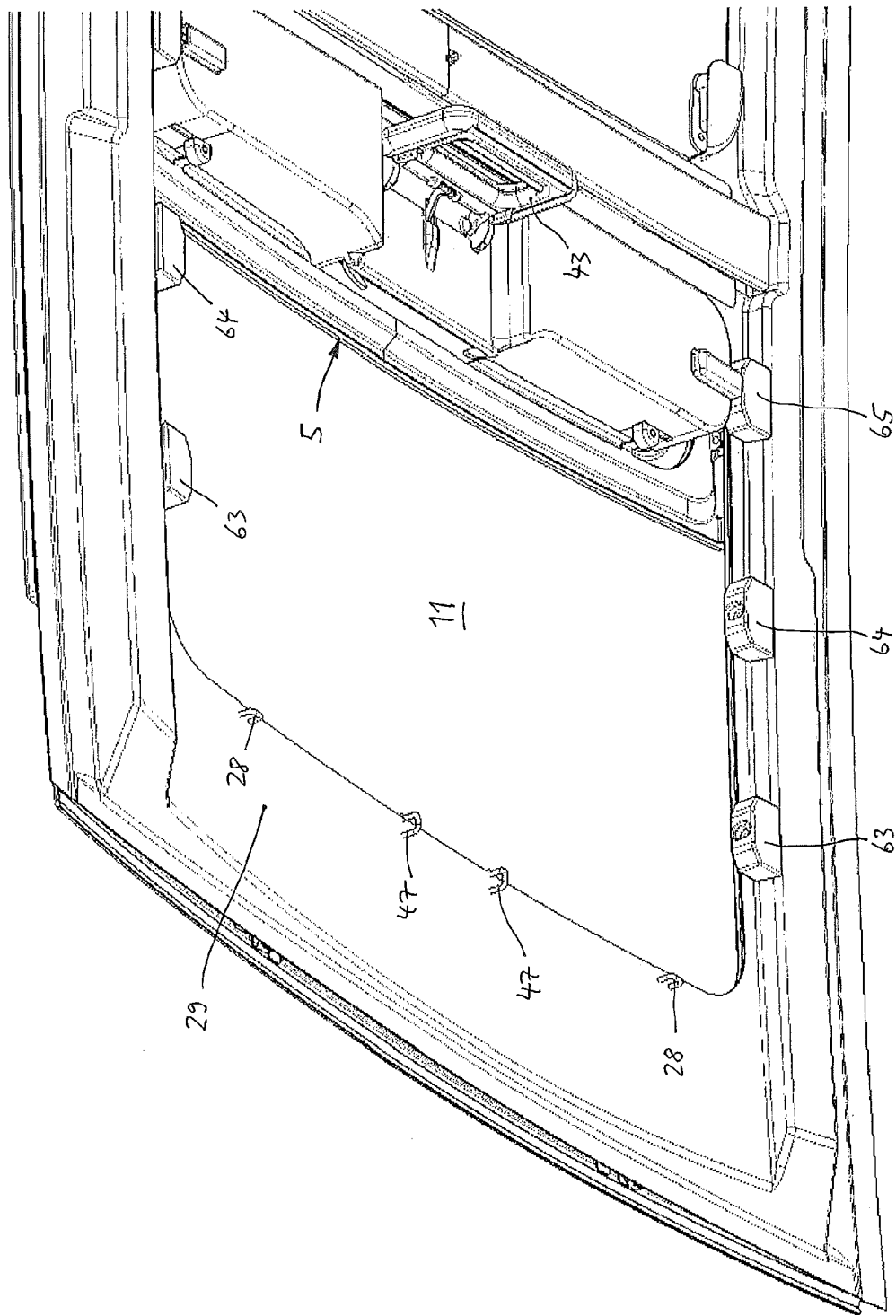
FIG. 10 shows an isometric top view in accordance with FIG. 9 of the sliding roof device, whereby the cover unit has been shifted into a rear open position.

For the complete freeing of the roof opening 11 the cover unit 5 is shifted into the position shown in FIG. 10. If the slide actuating part 57 is located without manual activation in its initial position, the arresting pin 49 can extend into the arresting recess 69 of the rear arresting engagement part 65 and therefore hold the cover unit 5 locked in its open position. When the handle 43 is pivoted into its horizontal position of rest (FIG. 11) the two arresting pins 49 are moved out into their maximal arresting position (position according to FIGS. 12 and 13) by the pivoting bolt hooks 34 and the adjusting rods 61.

In order to close the roof opening 11 at least partially, the handle 43 is pivoted down and the cover unit 5 is shifted forward by the handle 43. If the slide actuating part 57 is not actuated at first, a locking will take place on the rear arresting engagement part 65 that can be canceled by activating the slide actuating part 57 in the described manner. If the cover unit 5 is to be moved in an uninterrupted sliding motion into its front closed position, then the slide actuating part 57 is activated at once and the arresting pin 49 is held in its withdrawn position.

The arresting device 32 also makes possible a blocking of the cover unit 5 if the latter is arranged in a partial opening position without locking and a high acceleration occurs such as, e.g., during a collision that suddenly moves the cover unit 5. Upon reaching the next arresting engagement part a locking will take place that prevents a further moving of the cover unit 5.

The freeing of a roof opening can also take place by removing the cover 13 from the cover frame 14 arranged in the closed position. Starting from the closed position of the cover unit 5 in accordance with FIG. 6 the two bolt parts 25 are separated from the bolting engagement on the cover 13 and brought in bolting engagement on the engagement part 28 of the front transverse frame part 29 of the sliding roof frame 4 and pivoted, especially manually. The cover frame 14 is therefore fixed on the sliding roof frame 4 and can no longer be shifted on the rails 9 and 10. During the pivoting down of the handle 43 the bolt hooks 34 are separated from their locking on the bolting engagement parts 47. Therefore, the cover 13 can be removed from the cover frame 14. The entire structural group 30 for actuation, locking and arresting is also removed with the cover 13 so that the freed cover frame opening 15 also makes a comparatively large roof opening available.

The carrier component 35 of the structural group 30 is connected via several connections such as, e.g., screw connections 71 to the cover 13 on its bottom. The cover 13 is manufactured, e.g., from a plastic material or a composite material on which screw connections are possible. The structural group 30 can comprise a one-part or multipart covering 72.

The spring 52 on the Bowden wire 53 is provided for tolerance compensation in the mechanical chain between the arresting pin holder 48 and the pivot lever 54.

The individual features of the invention disclosed in the specification and using the exemplary embodiment as well as in the figures can be combined in any technically purposeful arrangements and shapes with the subject matter of the invention in its general form.

The invention claimed is:

1. A vehicle sliding roof device with a cover unit that is shiftably supported on guides of the sliding roof device by a support device and that can be adjusted between a closed position covering a roof opening and at least one open position, wherein a locking device which detachably locks the cover unit at least in its closed position and an arresting device with which the cover unit can be arrested from shifting relative to the guides at least in different opening positions can both be activated by a manually operated activating device,
    wherein the locking device and the arresting device as well as the actuating device form a structural group that is arranged on the cover unit, and
    wherein the cover unit comprises a cover frame to which the cover with the structural group attached to it is detachably attached for freeing a roof or cover frame opening.

2. The sliding roof device according to claim 1, wherein the cover unit that is moved along the guides can be fixed either by an arresting engagement of the arresting device present in a ready position, or it can freely shift as the arresting device is kept inactive by manual operation.

3. The sliding roof device according to claim 1, wherein the actuating device is arranged on the cover unit and comprises an adjustably supported handle that holds at least one bolt or bolt hook of the locking device in the bolted position on a bolt engagement part in its rest position, and in its actuating position it has released the bolt or bolt hook out of its locking.

4. The sliding roof device according to claim 1, wherein the arresting device contains at least one arresting component that is movably supported on the cover unit and can be adjusted on the side edge of the cover unit on at least one arresting engagement part arranged on the sliding roof frame by pretension in the arresting engagement.

5. A vehicle sliding roof device with a cover unit that is shiftably supported on guides of the sliding roof device by a support device and that can be adjusted between a closed position covering a roof opening and at least one open position, wherein a locking device which detachably locks the cover unit at least in its closed position and an arresting device with which the cover unit can be arrested from shifting relative to the guides at least in different opening positions can both be activated by a manually operated activating device,
    wherein the arresting device contains at least one arresting component that is movably supported on the cover unit and can be adjusted on the side edge of the cover unit on at least one arresting engagement part arranged on the sliding roof frame by pretension in the arresting engagement, and
    wherein the arresting component can be adjusted by the activating device by an adjusting unit comprising a Bowden wire into an inactive withdrawal position.

6. The sliding roof device according to claim 5, wherein the adjusting unit and/or the Bowden wire comprises a spring.

7. The sliding roof device according to claim 5, wherein the arresting device and/or the adjusting unit can be operated by a slide actuation part of the actuating device that is arranged for one-hand operation during the manual shifting of the cover unit.

8. A vehicle sliding roof device with a cover unit that is shiftably supported on guides of the sliding roof device by a support device and that can be adjusted between a closed position covering a roof opening and at least one open position, wherein a locking device which detachably locks the cover unit at least in its closed position and an arresting device with which the cover unit can be arrested from shifting relative to the guides at least in different opening positions can both be activated by a manually operated activation device,
    wherein the arresting device contains at least one arresting component that is movably supported on the cover unit and can be adjusted on the side edge of the cover unit on at least one arresting engagement part arranged on the sliding roof frame by pretension in the arresting engagement, and
    wherein the arresting component can be moved in a position of readiness against a pretensioning force during a moved cover unit from an arresting bevel on the arresting engagement part and can be moved out by the pretensioning force in arresting engagement on the arresting engagement part.

9. The sliding roof device according to claim 1, wherein the structural group comprises a carrier structure that is attached on the bottom of the cover, in the vicinity of the front edge of the cover.

10. The vehicle sliding roof device of claim 1, wherein the arresting device positively arrests the cover unit.

* * * * *